(12) United States Patent
Watanabe et al.

(10) Patent No.: US 10,941,859 B2
(45) Date of Patent: Mar. 9, 2021

(54) SHIFT DEVICE

(71) Applicant: KABUSHIKI KAISHA TOKAI-RIKA-DENKI-SEISAKUSHO, Aichi-ken (JP)

(72) Inventors: Hironori Watanabe, Aichi-ken (JP); Koji Imai, Aichi-ken (JP); Munetoshi Makimura, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 112 days.

(21) Appl. No.: 16/225,351

(22) Filed: Dec. 19, 2018

(65) Prior Publication Data

US 2019/0211917 A1    Jul. 11, 2019

(30) Foreign Application Priority Data

Jan. 5, 2018    (JP) ................................. 2018-000840

(51) Int. Cl.
*F16H 61/22* (2006.01)
*F16H 59/10* (2006.01)
*F16H 59/02* (2006.01)
*F16H 61/24* (2006.01)

(52) U.S. Cl.
CPC ......... *F16H 61/22* (2013.01); *F16H 59/0278* (2013.01); *F16H 59/10* (2013.01); *F16H 61/24* (2013.01); *F16H 2061/247* (2013.01)

(58) Field of Classification Search
CPC ...... F16H 53/00; F16H 53/02; F16H 59/0278; F16H 59/10; F16H 2059/0282; F16H 2059/048; F16H 61/22; F16H 2061/223; F16H 2061/247; F16H 63/34; F16H 63/3408; B60K 20/02; G05G 1/04; G05G 5/04; G05G 5/06; G05G 5/08
See application file for complete search history.

(56) References Cited

U.S. PATENT DOCUMENTS

| | | | |
|---|---|---|---|
| 10,309,525 B2* | 6/2019 | Heo | F16H 61/22 |
| 2002/0033033 A1* | 3/2002 | Hasegawa | F16H 61/22 70/247 |
| 2016/0312882 A1* | 10/2016 | Heo | F16H 61/24 |
| 2018/0363774 A1* | 12/2018 | Yamamoto | G05G 1/10 |
| 2019/0211916 A1* | 7/2019 | Morimura | F16H 59/0204 |
| 2020/0149626 A1* | 5/2020 | Nakagawa | G05G 1/04 |
| 2020/0166123 A1* | 5/2020 | Bagley | F16H 59/0208 |

FOREIGN PATENT DOCUMENTS

JP    2017-114170 A    6/2017

* cited by examiner

*Primary Examiner* — Prasad V Gokhale
(74) *Attorney, Agent, or Firm* — Roberts Calderon Safran & Cole P.C.

(57) ABSTRACT

A shift lever device has a shift lever that is moved and whose shift position is changed, and a detent plate that is displaced due to the shift lever being moved. The shift lever device has a first lock bar and a second lock bar that can move toward the detent plate side or a side opposite from the detent plate, and, due to the first lock bar and the second lock bar engaging with portions of the detent plate, a range over which the detent plate is displaced is restricted, and a range of movement of the shift lever is restricted. The shift lever device has a cam that has a single engaged-with portion with which the first lock bar and the second lock bar engage, and, due to the cam being displaced, the first lock bar and the second lock bar are moved.

5 Claims, 10 Drawing Sheets

SHIFT DEVICE

CROSS-REFERENCE TO RELATED APPLICATION

This application claims priority under 35 USC 119 from Japanese Patent Application No. 2018-000840 filed Jan. 5, 2018, the disclosure of which is incorporated by reference herein.

BACKGROUND

Field of Invention

The present disclosure relates to a shift device.

Related Art

Japanese Patent Application Laid-Open (JP-A) No. 2017-114170 discloses a shift locking device having a knob that is changed to one shift position among plural shift positions by being operated by a vehicle occupant, and a shift locking mechanism that restricts operation of the knob. In the shift device disclosed in JP-A No. 2017-114170, operation of the knob is restricted by a restricting portion that structures a portion of the shift locking mechanism being engaged with a portion of a knob main body that rotates integrally with the knob.

By the way, in a shift device in which the operating range of an operating portion such as a knob or the like is restricted to a predetermined range, it is desirable to simplify the mechanism that moves the restricting portion (the restricting body).

SUMMARY

In view of the above-described circumstances, there is provided a shift device that can devise simplification of a mechanism that moves restricting body.

A shift device relating to a first aspect includes: a shift body that is moved to change a shift position; a displaced portion that is displaced due to the shift body being moved; a plurality of restricting bodies that are capable of moving toward a displaced portion side or a side opposite from the displaced portion, displacement of the displaced portion being restricted due to the restricting bodies engaging with a portion (portions) of the displaced portion, whereby movement of the shift body is restricted; and a driving body that includes a single engaged-with portion with which the plurality of restricting bodies engage, the restricting bodies being moved due to the driving body being displaced.

In a shift device relating to a second aspect, in the shift device of the first aspect, the driving body is rotatingly displaced, the engaged-with portion is provided along a rotation peripheral direction at an outer peripheral portion of the driving body, and the plural restricting bodies are moved in a rotation axial direction of the driving body accompanying rotation of the driving body.

In a shift device relating to a third aspect, in the shift device of the second aspect, the displaced portion is rotatingly displaced due to the shift body being moved, and a rotation shaft of the driving body and a rotation shaft of the displaced portion are disposed parallel to one another.

In a shift device relating to a fourth aspect, in the shift device of any of the first through third aspects, the restricting bodies engage with an outer peripheral portion of a rotation radial direction outer side of the displaced portion.

In accordance with the shift device relating to the first aspect, the shift position is changed by the shift body being moved. When the shift body is moved, the displaced portion is displaced. Here, the plural restricting bodies can move toward the displaced portion side or toward the side opposite from the displaced portion, and engage with the single engaged-with portion that is provided at the driving body. When the driving body is displaced, the restricting bodies are moved. When the restricting bodies engage with portion(s) of the displaced portion, displacement of the displaced portion is restricted. As a result, movement of the shift body is restricted. In this way, in accordance with the shift device relating to the first aspect, due to the plural restricting bodies being made to engage with the single engaged-with portion of the driving body, the respective restricting bodies can be moved, and simplification of the mechanism that moves the plural restricting bodies can be devised.

In accordance with the shift device relating to the second aspect, when the driving body is rotatingly displaced, the portions, which are engaged with the engaged-with portion of the driving body, of the restricting bodies are moved along the engaged-with portion. Due thereto, the restricting bodies are moved in the rotation axial direction of the driving body. In this way, in accordance with the shift device relating to the second aspect, due to the driving body being rotated, the plural restricting bodies can be moved in the rotation axial direction of the driving body. Due to such a structure, enlargement of the build in the rotation radial direction of the driving body at the shift device can be suppressed.

In accordance with the shift device relating to the third aspect, the rotation shaft of the driving body and the rotation shaft of the displaced portion are disposed parallel to one another. Due to such a structure, enlargement of the build in the rotation radial direction of the driving body and the displaced portion at the shift device can be suppressed.

In accordance with the shift device relating to the fourth aspect, due to the structure in which the restricting bodies engage with the outer peripheral portion of the rotation radial direction outer side of the displaced portion, stresses that arise at the displaced portion and the restricting bodies at the time when load is inputted to the shift body can be lessened.

BRIEF DESCRIPTION OF THE DRAWINGS

An exemplary embodiment will be described in detail with reference to the following figures, wherein.

DETAILED DESCRIPTION

Figure 1:
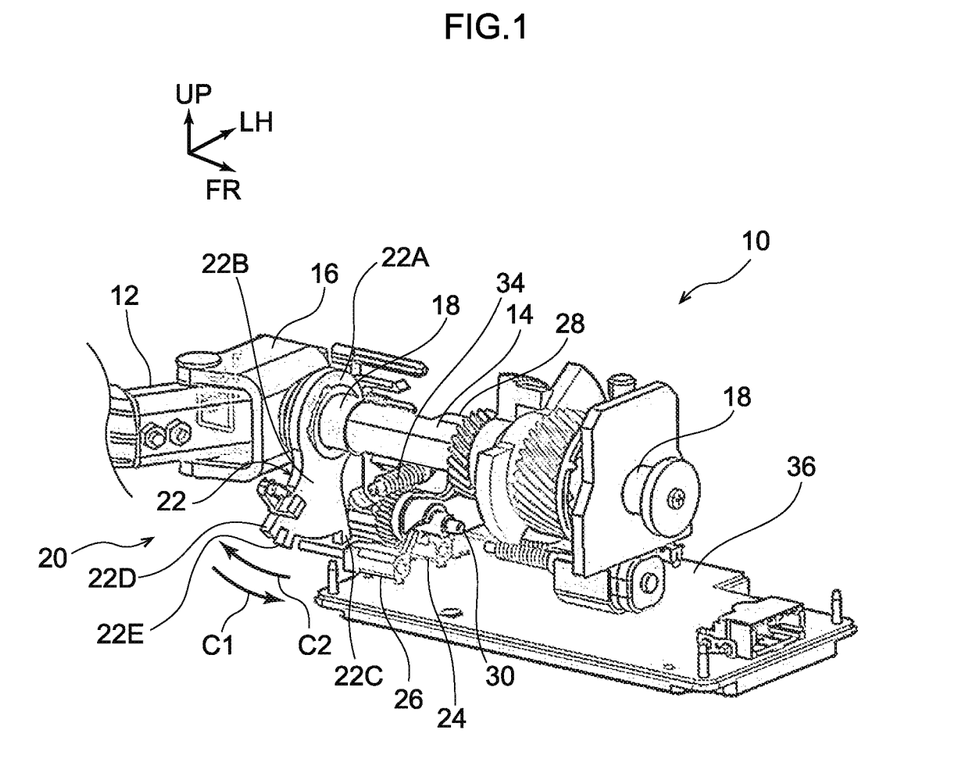
FIG. 1 is a perspective view in which a shift lever device is seen from a side opposite a shift lever.

A shift lever device 10 that serves as a shift device relating to an exemplary embodiment is shown in FIG. 1 in a perspective view that is seen from the side opposite a shift lever 12. Note that, in the drawings, the frontward direction of the shift lever device 10 is indicated by arrow FR, the leftward direction of the shift lever device 10 is indicated by arrow LH, and the upward direction of the shift lever device 10 is indicated by arrow UP. Further, the forward, leftward and upward directions of the shift lever device 10 respectively coincide with the frontward, leftward and upward directions of a vehicle.

The shift lever device 10 relating to the present exemplary embodiment is a so-called column type device in which the shift lever 12 that serves as a shift body extends toward a lateral side of a steering column of the vehicle, and the shift lever device 10 is installed (set) at the steering column of the vehicle.

The shift lever device 10 has a main shaft 14 that is formed in a solid cylindrical shape or a cylindrical tube shape. The shift lever 12 is connected via a shift lever connecting member 16 to an end portion that is at an axial direction one side (rear side) of the main shaft 14. The axial direction one side and an axial direction another side (front side) of the main shaft 14 are rotatably supported via collars 18 at an unillustrated body.

The shift lever 12 can be tilted (moved) in the vertical direction with the main shaft 14 being the central axis. The end portion of the shift lever 12, which end portion is at the side opposite the side connected to the shift lever connecting member 16, is a gripping portion that is gripped by a vehicle occupant (the driver in particular). Note that illustration of the gripping portion is omitted in FIG. 1. Further, the shift lever 12 can be tiltingly operated in the vertical direction in the state in which the gripping portion is being gripped. Due thereto, the shift position of the shift lever 12 is changed in the order of, for example, a "P" position, an "R" position, an "N" position and a "D" position from the upper side toward the lower side.

A shift locking mechanism 20 that restricts the range of movement of the shift lever 12 is provided at the axial direction one side of the main shaft 14. This shift locking mechanism 20 has a detent plate 22 that serves as a displaced portion that rotates (is rotatingly displaced) integrally with the main shaft 14, and a first lock bar 24 and a second lock bar 26 that serve as restricting bodies that, by engaging with the detent plate 22, restrict the range of rotation of the detent plate 22. Further, the shift locking mechanism 20 has a cam 30 that serves as a driving body, with which the first lock bar 24 and the second lock bar 26 are engaged and by which the first lock bar 24 and the second lock bar 26 are moved due to the cam 30 being rotated (rotatingly displaced) by a motor 28.

The detent plate 22 is formed in the shape of a plate whose thickness direction is the axial direction of the main shaft 14. The detent plate 22 has a fixed portion 22A that is fixed by welding or the like to the main shaft 14 in a state in which the main shaft 14 is inserted therethrough, and an engaging plate portion 22B that extends from the fixed portion 22A toward the rotation radial direction outer side of the main shaft 14 (the rotation radial direction outer side of the detent plate 22) and that is formed substantially in the shape of a fan as seen from the axial direction of the main shaft 14. A first projecting portion 22C that projects-out toward the rotation radial direction outer side of the main shaft 14 is formed at the engaging plate portion 22B at the rotation radial direction outer side of the main shaft 14 and at the end portion that is at a rotation peripheral direction one side (the arrow C1 direction side). Further, a second projecting portion 22D that projects-out toward the rotation radial direction outer side of the main shaft 14 is formed at the engaging plate portion 22B at the rotation radial direction outer side of the main shaft 14 and at the end portion at a rotation peripheral direction another side (the arrow C2 direction side). Moreover, an intermediate projecting portion 22E that projects-out toward the rotation radial direction outer side of the main shaft 14 is formed at the engaging plate portion 22B at the rotation radial direction outer side of the main shaft 14 and between the first projecting portion 22C and the second projecting portion 22D. The interval between the intermediate projecting portion 22E and the second projecting portion 22D (the interval in the rotation peripheral direction of the main shaft 14) is set to be narrower than the interval between the intermediate projecting portion 22E and the first projecting portion 22C (the interval in the rotation peripheral direction of the main shaft 14), and the interval between the intermediate projecting portion 22E and the second projecting portion 22D is set to be a dimension that is slightly wider than the width dimension (the dimension in the rotation peripheral direction of the main shaft 14) of a detent plate engaging portion 26A of the second lock bar 26 that is described later.

Figure 2:
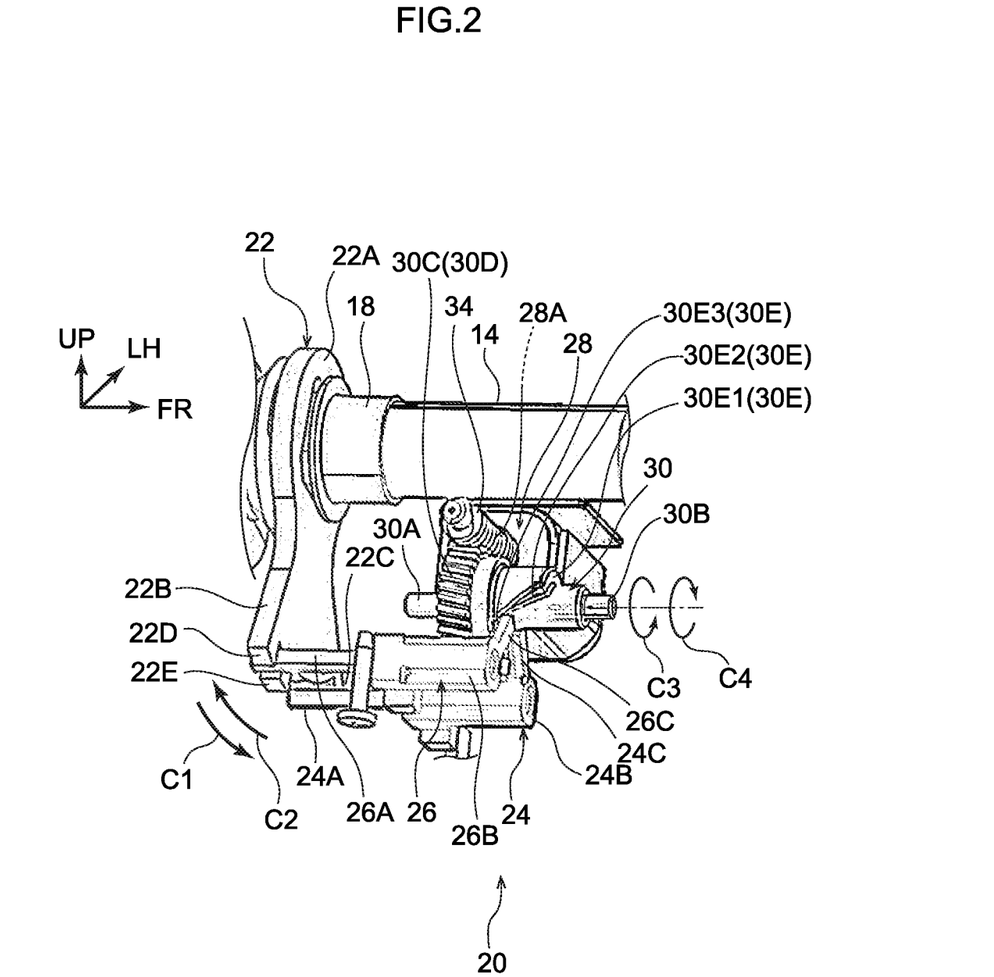
FIG. 2 is an enlarged perspective view showing, in an enlarged manner, a peripheral portion of a shift locking mechanism of the shift lever device.

As shown in FIG. 2, the first lock bar 24 can move in the rotation axial direction of the cam 30 that is described later. Note that the first lock bar 24 can move in the rotation axial direction of the cam 30 that is described later, due to the first lock bar 24 being slidably supported by an unillustrated supporting member. The portion, which is at the detent plate 22 side, of the first lock bar 24 is a detent plate engaging portion 24A that is configured to engage with the detent plate 22. Further, the portion, which is at the side opposite the detent plate 22 and that is disposed coaxially with the detent plate engaging portion 24A, at the first lock bar 24 is a spring engaging portion 24B. Due to a spring 32 (see FIG. 5) engaging with this spring engaging portion 24B, the first lock bar 24 is urged toward the detent plate 22 side. Further, the first lock bar 24 has a cam engaging portion 24C that extends from the spring engaging portion 24B toward the side of the cam 30 that is described later, and that engages with the cam 30.

The basic structure of the second lock bar 26 is similar to that of the above-described first lock bar 24. This second lock bar 26 can move in the rotation axial direction of the cam 30 that is described later, due to the second lock bar 26 being slidably supported by an unillustrated supporting member. Note that the detent plate engaging portion 26A, a spring engaging portion 26B and a cam engaging portion 26C of the second lock bar 26 correspond to the detent plate engaging portion 24A, the spring engaging portion 24B and the cam engaging portion 24C of the first lock bar 24.

Figure 3:
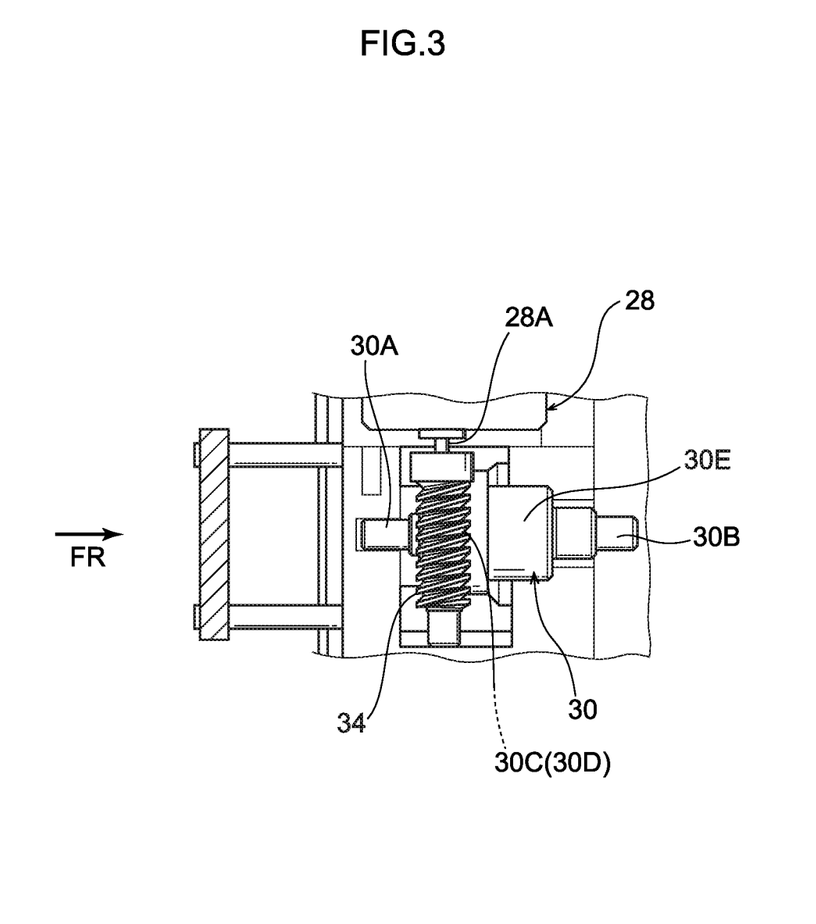
FIG. 3 is an enlarged plan view showing, in an enlarged manner, the peripheral portion of the shift locking mechanism of the shift lever device.

As shown in FIG. 2 and FIG. 3, the cam 30 can rotate (be rotatingly displaced) due to a rotation axial direction one side end portion 30A and a rotation axial direction another side end portion 30B of the cam 30 both being supported (both ends supported) by a same part. The rotation axis of the cam 30 and the rotation axis of the main shaft 14 are disposed parallel to one another. Further, the cam 30 has a worm wheel portion 30D at whose outer peripheral portion external teeth 30C are formed. The external teeth 30C of this worm wheel portion 30D are engaged with a worm gear 34 that is fixed to a rotation shaft 28A of the motor 28. Further, the rotation shaft 28A of the motor 28 is rotated by being energized via a circuit device 36 (see FIG. 1). The cam 30 is rotated due to the rotation of this rotation shaft 28A being transmitted to the cam 30 via the worm gear 34 and the worm wheel portion 30D. Note that, in the present exemplary embodiment, the rotation axial direction of the rotation shaft 28A of the motor 28 is oriented in a direction orthogonal to the rotation axial directions of the main shaft 14 and the cam 30, and the worm gear 34, which is fixed to the rotation shaft 28A of the motor 28, is disposed between the main shaft 14 and the cam 30.

Figure 4:
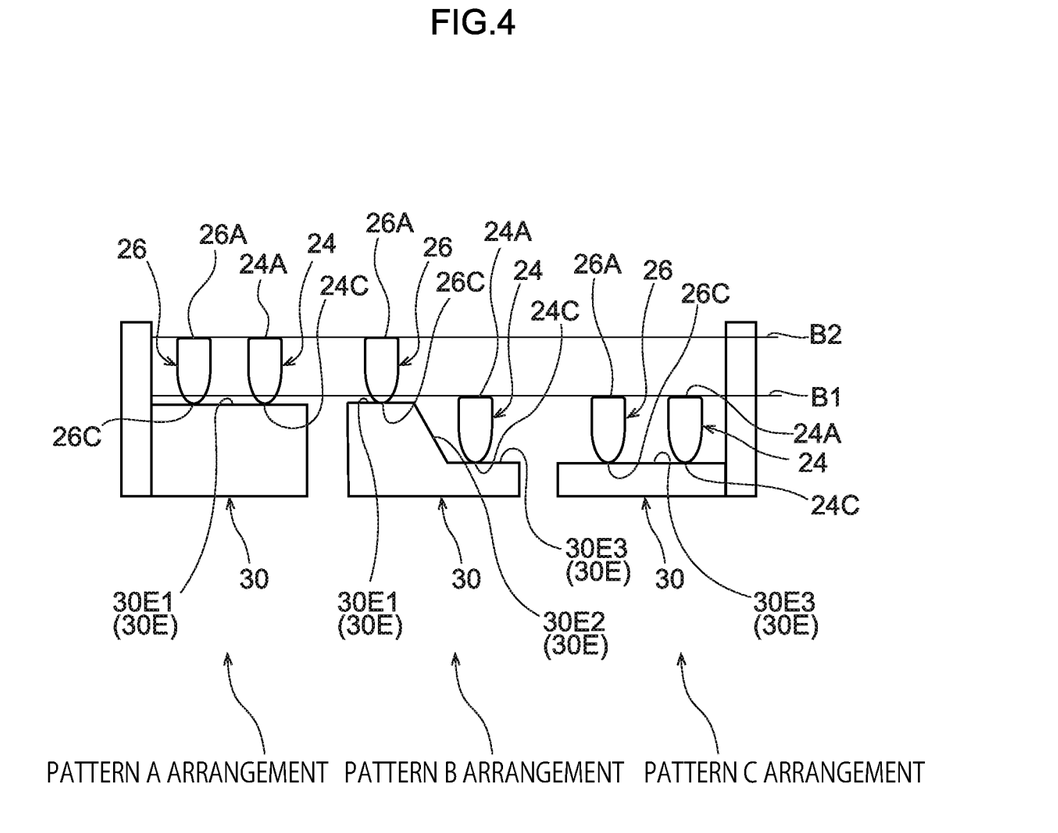
FIG. 4 is a schematic drawing in which movement of a first lock bar and a second lock bar is illustrated schematically.

As shown in FIG. 2 and FIG. 4, the cam 30 has an engaged-with portion 30E for moving the detent plate engaging portion 24A of the first lock bar 24 and the detent plate engaging portion 26A of the second lock bar 26 from locking position B1 to unlocking position B2, or from the unlocking position B2 to the locking position B1. This engaged-with portion 30E is formed on the outer peripheral portion of the portion that is adjacent to the worm wheel portion 30D. Concretely, the engaged-with portion 30E has a first abutment surface 30E1, an inclined surface 30E2 and a second abutment surface 30E3 that are abutted by the detent plate 22 side end surface of the cam engaging portion 24C of the first lock bar 24 and the detent plate 22 side end surface of the cam engaging portion 26C of the second lock bar 26. The first abutment surface 30E1, the inclined surface 30E2 and the second abutment surface 30E3 are connected along the rotation peripheral direction of the cam 30.

The first abutment surface 30E1 extends substantially parallel to the rotation radial direction of the cam 30. In the state in which the cam engaging portion 24C of the first lock bar 24 and the cam engaging portion 26C of the second lock bar 26 are abutting the first abutment surface 30E1, the detent plate engaging portion 24A of the first lock bar 24 and the detent plate engaging portion 26A of the second lock bar 26 are disposed at the unlocking position B2. Note that the state in which the detent plate engaging portions 24A, 26A are disposed at the unlocking position B2 means a state in which the detent plate engaging portions 24A, 26A are disposed at positions of not being engaged with the outer peripheral surface of the detent plate 22 (positions at which the detent plate engaging portions 24A, 26A do not abut the outer peripheral portion of the detent plate 22).

The second abutment surface 30E3 is disposed further toward the detent plate 22 side than the first abutment surface 30E1, and extends substantially parallel to the rotation radial direction of the cam 30. Further, in the state in which the cam engaging portion 24C of the first lock bar 24 and the cam engaging portion 26C of the second lock bar 26 are abutting the second abutment surface 30E3, the detent plate engaging portion 24A of the first lock bar 24 and the detent plate engaging portion 26A of the second lock bar 26 are disposed at the locking position B1. Note that the state in which the detent plate engaging portions 24A, 26A are disposed at the locking position B1 is a state in which the detent plate engaging portions 24A, 26A are disposed at positions at which they can engage with the outer peripheral portion of the detent plate 22 (positions at which the detent plate engaging portions 24A, 26A can abut the outer peripheral portion of the detent plate 22).

The inclined surface 30E2 connects the first abutment surface 30E1 and the second abutment surface 30E3, and is inclined toward a rotation peripheral direction one side of the cam (the arrow C3 side) while heading from the first abutment surface 30E1 side toward the second abutment surface 30E3 side. Further, in the state in which the cam 30 is rotated toward a rotation peripheral direction another side (the arrow C4 side) and the cam engaging portion 24C of the first lock bar 24 and the cam engaging portion 26C of the second lock bar 26 move on the inclined surface 30E2 from the first abutment surface 30E1 side toward the second abutment surface 30E3 side, the first lock bar 24 and the second lock bar 26 are moved to the detent plate 22 side by the urging forces of the springs 32. In contrast, in the state in which the cam 30 is rotated toward the rotation peripheral direction one side, and the cam engaging portion 24C of the first lock bar 24 and the cam engaging portion 26C of the second lock bar 26 move on the inclined surface 30E2 from the second abutment surface 30E3 side toward the first abutment surface 30E1 side, the first lock bar 24 and the second lock bar 26 are moved toward the side opposite the detent plate 22 against the urging forces of the springs 32.

Here, as shown in FIG. 4, the state in which both the detent plate engaging portion 24A of the first lock bar 24 and the detent plate engaging portion 26A of the second lock bar 26 are disposed at the unlocking position B2 is called pattern A arrangement. Further, the state in which the detent plate engaging portion 24A of the first lock bar 24 is disposed at the locking position B1 and detent plate engaging portion 26A of the second lock bar 26 is disposed at the unlocking position B2 is called pattern B arrangement. Moreover, the state in which the detent plate engaging portion 24A of the first lock bar 24 and the detent plate engaging portion 26A of the second lock bar 26 are both disposed at the locking position B1 is called pattern C arrangement. In the present exemplary embodiment, rotation of the rotation shaft 28A of the motor 28 is controlled by the circuit device 36 (see FIG. 1) such that the detent plate engaging portion 24A of the first lock bar 24 and the detent plate engaging portion 26A of the second lock bar 26 are disposed in one of the pattern A arrangement, the pattern B arrangement, and the pattern C arrangement.

Operation and Effects of Present Exemplary Embodiment

Operation and effects of the present exemplary embodiment are described next.

At the shift lever device 10 of the above-described structure, the shift lever 12 is tiltingly operated in the vertical direction, and the shift position is placed at the "P" position, the "R" position, the "N" position or the "D" position.

Figure 5:
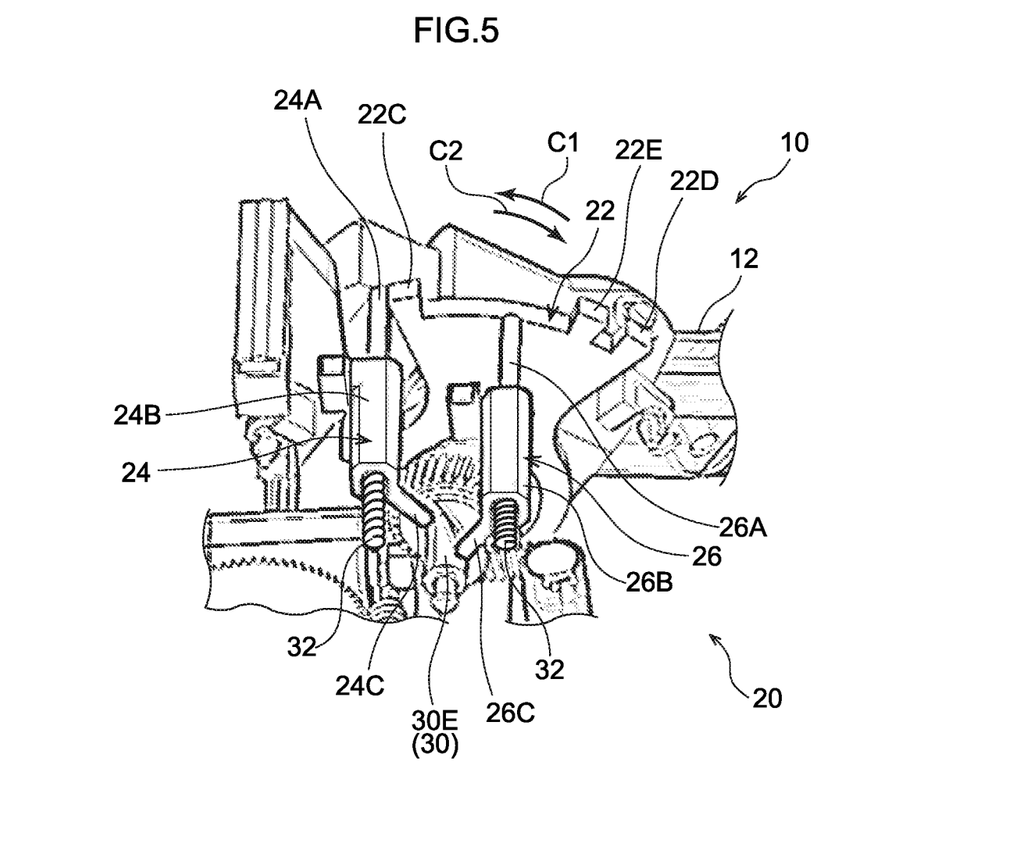
FIG. 5 is an enlarged perspective view showing, in an enlarged manner, the peripheral portion of the shift locking mechanism in a state in which the shift lever is locked at a P position.

Here, as shown in FIG. 4 and FIG. 5, in a case in which the shift position of the shift lever 12 is disposed at the "P" position, and at the time when the brake is not operated, the detent plate engaging portion 24A of the first lock bar 24 and the detent plate engaging portion 26A of the second lock bar 26 are set in the pattern B arrangement. In this state, the detent plate engaging portion 24A of the first lock bar 24 is disposed at the rotation peripheral direction one side of the detent plate 22 (the arrow C1 direction side) with respect to the first projecting portion 22C of the detent plate 22, and is disposed adjacent to the first projecting portion 22C. Due thereto, rotational displacement of the main shaft 14 toward the rotation peripheral direction one side is restricted due to the rotational displacement toward the rotation peripheral direction one side of the detent plate 22 being restricted by the first lock bar 24. As a result, tilting of the shift lever 12 from the "P" position to the "R" position side, the "N" position side, the "D" position side is restricted.

Figure 6:
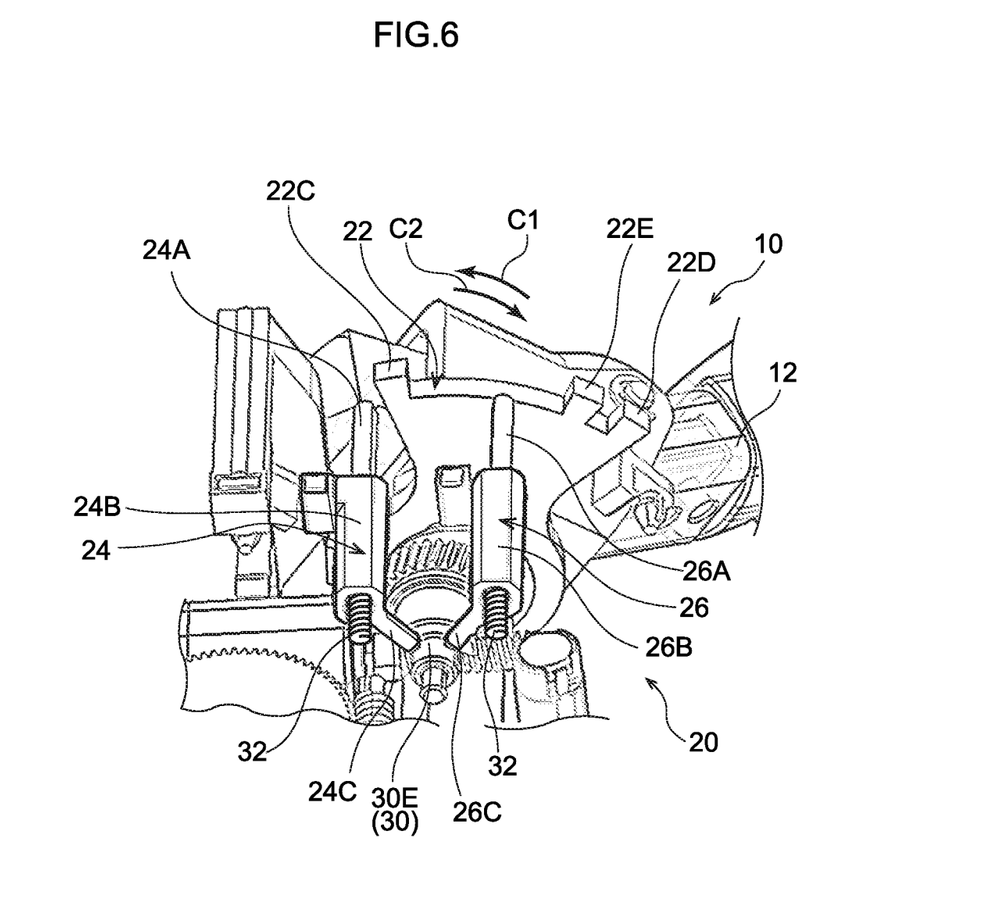
FIG. 6 is an enlarged perspective view showing, in an enlarged manner, the peripheral portion of the shift locking mechanism in a state in which locking of the shift lever is released from the state shown in FIG. 5.

On the other hand, in a case in which the shift lever 12 is disposed at the "P position", and when the brake is operated, as shown in FIG. 4 and FIG. 6, the detent plate engaging portion 24A of the first lock bar 24 and the detent plate engaging portion 26A of the second lock bar 26 are set in the pattern A arrangement. In this state, rotational displacement of the detent plate 22 is not restricted by the first lock bar 24 and the second lock bar 26. Due thereto, the shift lever 12 can be tilted from the "P" position to the "R" position, the "N" position, the "D" position.

Figure 7:
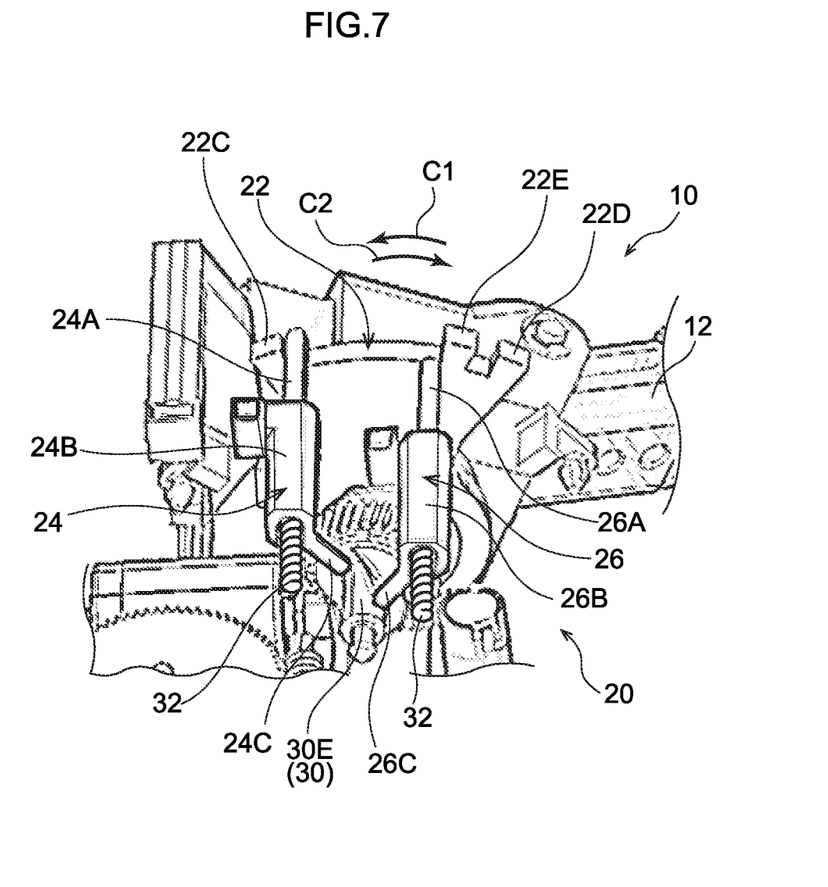
FIG. 7 is an enlarged perspective view showing, in an enlarged manner, the peripheral portion of the shift locking mechanism in a state in which the shift lever is positioned at an R position.
Figure 8:
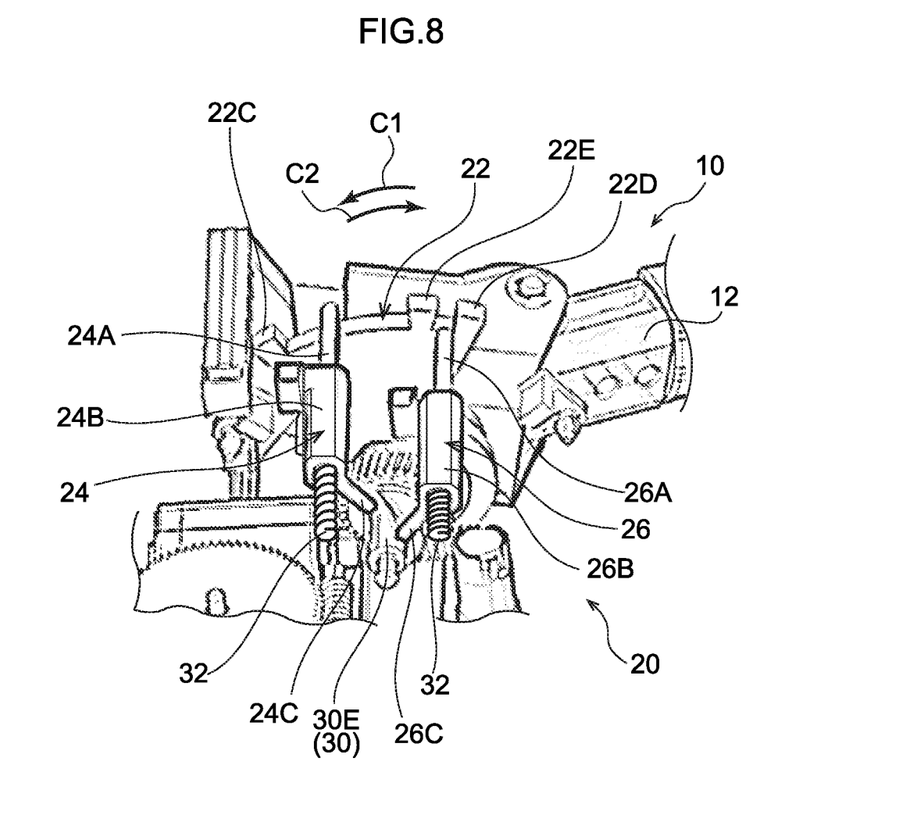
FIG. 8 is an enlarged perspective view showing, in an enlarged manner, the peripheral portion of the shift locking mechanism in a state in which the shift lever is positioned at an N position.
Figure 9:
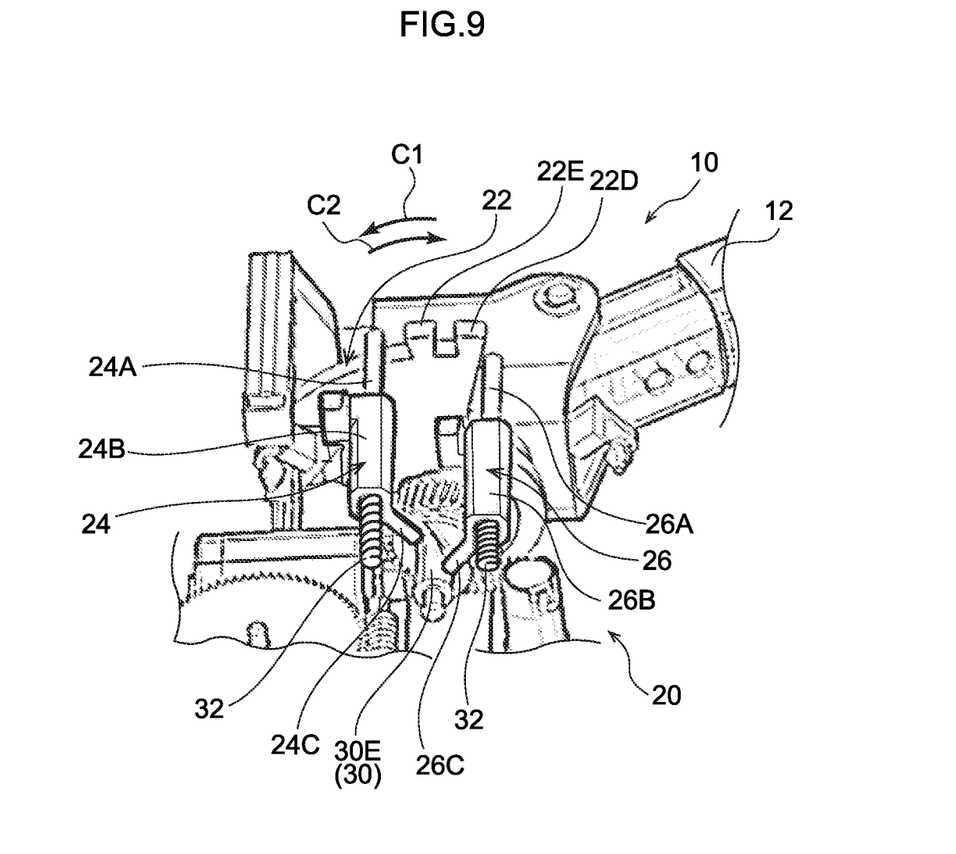
FIG. 9 is an enlarged perspective view showing, in an enlarged manner, the peripheral portion of the shift locking mechanism in a state in which the shift lever is positioned at a D position.

Further, in a case in which the shift lever 12 is placed from the "P" position to the "R" position, as shown in FIG. 4 and FIG. 7, the detent plate engaging portion 24A of the first lock bar 24 and the detent plate engaging portion 26A of the second lock bar 26 are set in the pattern B arrangement. In this state, the detent plate engaging portion 24A of the first lock bar 24 is disposed between the first projecting portion 22C and the intermediate projecting portion 22E of the detent plate 22. Due thereto, the shift lever 12 can be tilted to the "R" position shown in FIG. 7, the "N" position shown in FIG. 8, and the "D" position shown in FIG. 9.

Figure 10:
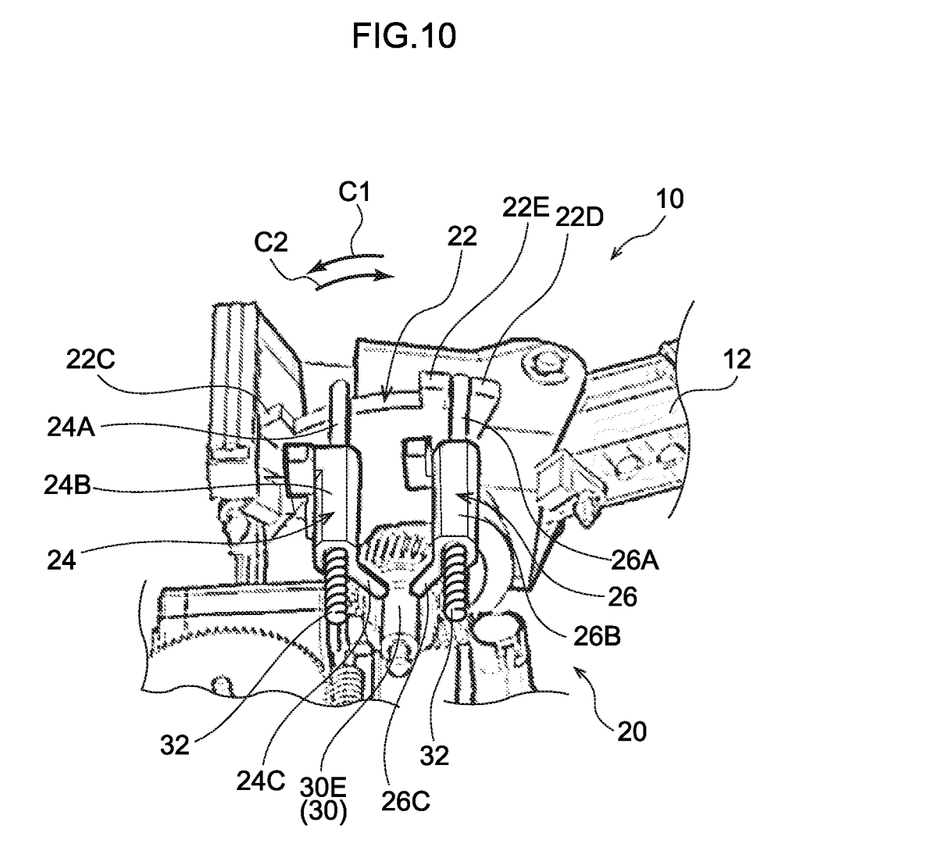
FIG. 10 is an enlarged perspective view showing, in an enlarged manner, the peripheral portion of the shift locking mechanism in a state in which the shift lever is locked at the N position.

Moreover, as shown in FIG. 4 and FIG. 10, in a case in which the shift lever 12 is disposed at the "N" position, and at the time when a lock switch is operated, the detent plate engaging portion 24A of the first lock bar 24 and the detent plate engaging portion 26A of the second lock bar 26 are set in the pattern C arrangement. In this state, the detent plate engaging portion 26A of the second lock bar 26 is disposed between the intermediate projecting portion 22E and the second projecting portion 22D of the detent plate 22. Due thereto, rotational displacement of the main shaft 14 toward the rotation peripheral direction one side and the rotation peripheral direction another side is restricted due to rotational displacement of the detent plate 22 toward the rotation peripheral direction one side and the rotation peripheral direction another side being restricted by the second lock bar 26. As a result, tilting of the shift lever 12 from the "N" position is restricted.

Here, in the shift lever device 10 of the present exemplary embodiment, the first lock bar 24 and the second lock bar 26 can be moved due to the cam engaging portion 24C of the first lock bar 24 and the cam engaging portion 26C of the second lock bar 26 abutting the first abutment surface 30E1, the inclined surface 30E2 and the second abutment surface 30E3 of the cam 30. Due thereto, simplification of the mechanism that moves the first lock bar 24 and the second lock bar 26 can be devised. Namely, the structure of the cam 30 becoming complex can be suppressed.

Further, in the shift lever device 10 of the present exemplary embodiment, when the cam 30 is rotated, the first lock bar 24 and the second lock bar 26 are moved in the rotation axial direction of the cam 30. Due thereto, enlargement of the build in the rotation radial direction of the cam 30 of the mechanism that moves the first lock bar 24 and the second lock bar 26 is suppressed. As a result, enlargement of the build of the shift lever device 10 (enlargement of the build in the rotation radial direction of the cam 30) can be suppressed.

Moreover, in the shift lever device 10 of the present exemplary embodiment, the rotation axis of the cam 30 and the rotation axis of the main shaft 14 and the rotation axis of the detent plate 22 are disposed parallel to one another. Due thereto, enlargement of the build of the shift lever device 10 (enlargement of the build in the rotation radial direction of the cam 30, the main shaft 14 and the detent plate 22) can be suppressed.

In the shift lever device 10 of the present exemplary embodiment, the range of tilting of the shift lever 12 is restricted, due to the detent plate engaging portion 24A of the first lock bar 24 abutting the first projecting portion 22C and the intermediate projecting portion 22E that are provided at the outer peripheral portion at the rotation radial direction outer side of the detent plate 22, and due to the detent plate engaging portion 26A of the second lock bar 26 abutting the intermediate projecting portion 22E and the second projecting portion 22D. Due thereto, at the time when load is inputted to the shift lever 12, stresses that arise at the first lock bar 24, the second lock bar 26 and the detent plate 22 can be lessened.

Note that the present exemplary embodiment describes an example in which the first lock bar 24 and the second lock bar 26 are moved due to the cam 30, which has the first abutment surface 30E1, the inclined surface 30E2 and the second abutment surface 30E3, being rotated. However, the present disclosure is not limited to this. It suffices to appropriately set the forms of the portions at the cam 30, which engage with the first lock bar 24 and the second lock bar 26, in consideration of the movement of and the arrangement of and the like of the first lock bar 24 and the second lock bar 26.

Further, as a pattern that is opposite to the pattern B arrangement of FIG. 4, the engaged-with portion 30E and the like may be set such that there is an arrangement (pattern D arrangement) in which the first lock bar 24 is at the unlocking position B2 and the second lock bar 26 is at the locking position B1.

Further, although the present exemplary embodiment describes an example in which the first lock bar 24 and the second lock bar 26 are moved as described above, the present disclosure is not limited to this. For example, the engaged-with portion 30E and the like may be set such that the first lock bar 24 and the second lock bar 26 move simultaneously in the same direction.

Moreover, the present disclosure is not limited to a lever-operation-type shift device such as in the present exemplary embodiment, and can be applied as well to a dial-operation-type shift device.

Although an exemplary embodiment of the present disclosure has been described above, the present disclosure is not limited to the above, and, of course, can be implemented by being modified in various ways other than the above within a scope that does not depart from the gist thereof.

What is claimed is:
1. A shift device comprising:
a shift body that is moved to change a shift position;
a displaced portion that is displaced due to the shift body being moved;
a plurality of restricting bodies that are capable of moving toward a displaced portion side or a side opposite from the displaced portion, displacement of the displaced portion being restricted due to the restricting bodies engaging with a portion of the displaced portion, whereby movement of the shift body is restricted; and a driving body that includes a single engaged-with portion with which the plurality of restricting bodies engage, the restricting bodies being moved due to the driving body being displaced, wherein the driving body is rotatingly displaced, the engaged-with portion is provided along a rotation direction of the driving body at an outer peripheral portion of the driving body, and the plurality of restricting bodies are moved in a rotation axial direction of the driving body accompanying rotation of the driving body.

2. The shift device of claim 1, wherein:

the displaced portion is rotatingly displaced due to the shift body being moved, and a rotation shaft of the driving body and a rotation shaft of the displaced portion are disposed parallel to one another.

3. The shift device of claim 2, wherein the restricting bodies are configured to engage with an outer peripheral portion of the displaced portion at an outer side in a radial direction of rotation of the displaced portion.

4. The shift device of claim 1, wherein the restricting bodies are configured to engage with an outer peripheral portion of the displaced portion at an outer side in a radial direction of rotation of the displaced portion.

5. A shift device comprising:

a shift body connected to a rotation shaft that is moved to change a shift position;

a displaced portion that is moved integrally with the rotation shaft due to the shift body being moved;

a plurality of restricting bodies that are capable of moving toward a displaced portion side or a side opposite from the displaced portion, displacement of the displaced portion being restricted due to the restricting bodies engaging with a portion of the displaced portion, whereby movement of the shift body is restricted; and a driving body that has a rotation shaft different from the rotation shaft of the displaced portion and that includes a single engaged-with portion with which the plurality of restricting bodies engage, the restricting bodies being moved due to the driving body being displaced.

* * * * *